United States Patent

[11] 3,547,447

[72] Inventor Shinji Nakamori
Warabi-shi, Japan
[21] Appl. No. 655,201
[22] Filed July 21, 1967
[45] Patented Dec. 15, 1970
[73] Assignee Teikoku Dempa Kabushiki Kaisha
Tokyo, Japan
[32] Priority July 22, 1966
[33] Japan
[31] No. 41/47695

[54] TAPE RECORDER

11 Claims, 18 Drawing Figs.

[52] U.S. Cl. .................................................... 274/4
[51] Int. Cl. .................................................... G11b 21/04
[50] Field of Search ........................................ 179/100.2CA, 100.2Z; 274/4, 11; 242/55.13; 226/90

[56] References Cited

UNITED STATES PATENTS

| | | | |
|---|---|---|---|
| 3,437,762 | 4/1969 | Lear et al. | 274/4 |
| 3,388,911 | 6/1968 | Wilson et al. | 274/4 |
| 3,337,105 | 8/1967 | Wilson | 226/90 |

*Primary Examiner*—Harry N. Haroian
*Attorney*—Linton & Linton

ABSTRACT: The tape recorder is for use with either four track tape cartridges or eight track tape cartridges of different shapes and structure and the recorder head is adjusted to work with the particular cartridge inserted onto the recorder and a pinch roller is raised for insertion into the cartridge so inserted when the cartridge does not contain its own pinch roller.

INVENTOR.
SHINJI NAKAMORI
BY
Linton and Linton
ATTORNEYS

INVENTOR.
SHINJI NAKAMORI
BY
Linton and Linton
ATTORNEYS

INVENTOR.
SHINJI NAKAMORI
BY
Linton and Linton
ATTORNEYS

INVENTOR.
SHINJI NAKAMORI
BY
Linton and Linton
ATTORNEYS

FIG. 9
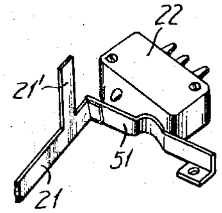
FIG. 11
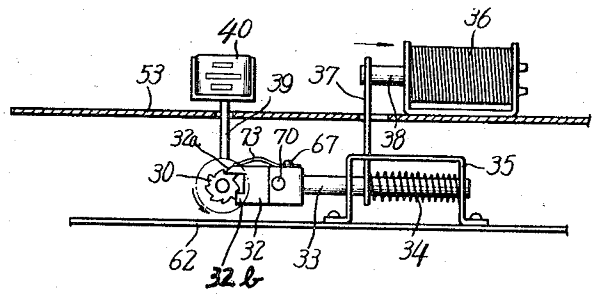
FIG. 10
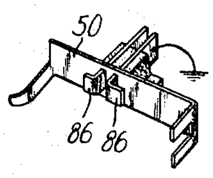
FIG. 13
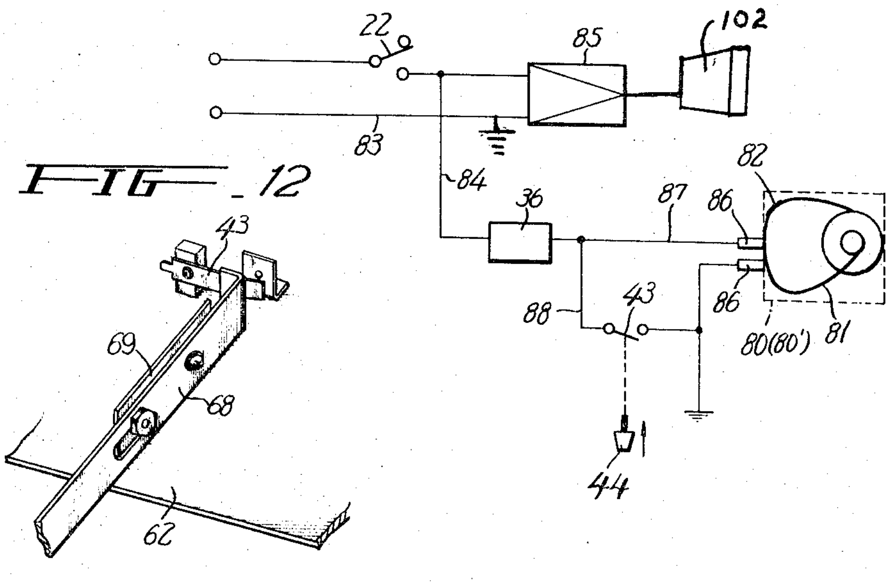
FIG. 12
INVENTOR.
SHINJI NAKAMORI
BY
Linton and Linton
ATTORNEYS INVENTOR.
SHINJI NAKAMORI
BY
Linton and Linton
ATTORNEYS INVENTOR.
SHINJI NAKAMORI
BY
Linton and Linton
ATTORNEYS INVENTOR.
SHINJI NAKAMORI
BY
Linton and Linton
ATTORNEYS

TAPE RECORDER

This invention relates to tape recorders, and in particular to effect steadily and correctly the transcription and the playing of a single tape recorder properly making change of the tape and its tape cartridge for tapes of different widths such as four track (two channel) tape or eight track (four channel) tape.

A tape recorder which is played with the cartridge containing the wound recorded tape is known. However, such a known tape recorder is designed only for either one system of the cartridged tape as that of a four track system or that of an eight track system. Heretofore, these two systems of tape recorders are basically different from each other, and the four track tape is played by a tape recorder designed for four track tape exclusively, and either track tape is played by a tape recorder designed for an eight track tape only.

In this case, the user of the tape recorder requires two sets of tape recorders, one for the four track tape and another for the eight track tape, thus if there is on hand an eight track tape and the tape recorder on hand is for a four track tape, this tape recorder cannot be played without a four track tape, on the other hand, if there is on hand a four track tape and the tape recorder on hand is for eight track, the playing of the tape recorder is impossible, in the same way. In case both the tape recorder for four track tape and the tape recorder for eight track tape are designed for using both these two kinds of tapes, not only is the cost for making these two kinds of tape recorders very expensive, but also either one tape recorder for each of these two types, or another tape recorder must be always kept available, thus extra space is additionally required for storing and keeping the tape recorder which is not being used, and considerable inconvenience of making things for alternately operating these two different kinds of tape recorders is also necessary. Especially in the case when the recorder is set and played in the engineer's seat of a train, the wall surface or the space for fitting the tape recorder is limited, accordingly, only one kind of tape recorder can be used.

An object of this present invention is to supply a tape recorder usable for both tapes of a four track system and an eight track system, eliminating the disadvantages and defects of the conventional tape recorders as mentioned above.

A principal object of this present invention is to supply a single tape recorder with which various numbers of tracks of the cartridged tapes can be played without being influenced by a change in the number of tracks of the tape wound up in the cartridge.

For the above reasons, in an embodiment of this present invention, by making good use of the inserted cartridge, that is, by adopting the cartridge as a changeover operating element for such purpose, its head position is changed over in accordance with the number of the tracks of tape in the cartridges.

Accordingly, the user of the tape recorder of this present invention can immediately perform the desired playing by inserting the cartridge in the tape recorder. It goes without saying that the furnishing of a plural number of tape recorders is made unnecessary, which is different from the case of the conventional tape recorders as mentioned above. In addition, the inconvenience of storing the other tape recorder which is not in use is also made unnecessary, and economical free playing of the tape recorder is made possible by this present invention.

Another object of this present invention is to provide a tape recorder which can be smoothly operated either manually or automatically in any case of the channel changeover of the above-mentioned cartridges. For the above purpose, in the embodiment of this present invention, a cam shaft equipped with a suitable cam is slidably supported, and a considerable length of feed gear is fitted, this feed gear being equipped with a changeover arm for receiving the operating force of a displaceable element and its spring.

To the electric circuit of a solenoid is connected the tape contact circuit to be automatically switched on and off by a conductor applied to the tape, and contact base circuits to be switched on and off manually by pushbutton operation are provided in parallel by which the changeover of the channel can be made automatically or manually, thus free optional changeover of channels can be made in accordance with the user's desire, in any case, and desired kind of cartridge is inserted in the tape recorder, and smooth playing of the cartridged recorded tape can be made. Control means is provided responsive to the width of the tape cartridge.

Another further purpose of the present invention is to supply a tape recorder which is usable both for the cartridge in which the wound tape is pressedly contained, with a Capstan rotating at a fixed speed and a pinch roller for feeding this Capstan at the fixed speed are provided, and also for a system in which the Capstan and the pinch roller are provided at the tape recorder, that is, on the outside of the cartridge.

Types of the tapes here considered wound up in the cartridge are in general four track and eight track, the former being fed by being pressed onto the recorder Capstan by the pinch roller provided in the tape recorder, and the latter being fed by being pressed onto the pinch roller provided in the cartridge.

Accordingly, for changing over the recorder head position in accordance with the number of the tracks, its purpose can not be achieved unless the tape recorder is designed so that it can adopt both the system in which the pinch roller is built in the cartridge, and also that in which the pinch roller is fitted to the recorder itself. Therefore, in this present invention, in the case of utilizing the pinch roller provided at the tape recorder, the pinch roller brought down by the inserted cartridge is contacted with the Capstan after the pinch roller is raised, but in the case in which the cartridge in which the pinch roller is provided is used, the cartridge is inserted in the prescribed inserting position as it is brought down without raising it, and the inserted cartridge is held at the prescribed inserting position by the separately provided roller which has a resilient pressing construction. In this way, the tape recorder can be played with both systems of the pinch rollers regardless of whether the pinch roller is provided in the cartridge or not.

Another purpose of this present invention is to supply the tape recorder for which the various sizes, especially, various width of cartridges, can be fitted to the single tape recorder for playing. For that purpose, in this present invention, the guide member designed for a comparatively narrow cartridge is provided capable of rise and fall between the cartridge guide provided for the comparatively wide cartridge, so that this guide member is smoothly brought down by the fed-in cartridge in case the wide cartridge is inserted, and in case the narrow cartridge is inserted, the effective guiding function is exerted as it is in the operating state, by which the playing time of the channel is varied, thus different sizes of cartridges can be inserted for playing in a single tape recorder.

Other characteristics of this present invention will be fully understood from the following description of an embodiment of this present invention.

In the drawings:

FIG. 9 is a detail view of the starting switch.

FIG. 10 is a perspective detail of the metal guide piece for holding the cartridge and for guiding the tape.

FIG. 11 is an elevation with parts in section of the solenoid and the head for the tape.

FIG. 12 is a perspective of the switch with its cam shaft mechanism.

FIG. 13 is a circuit diagram of the solenoid controlling mechanism of this invention.

Figure 1:
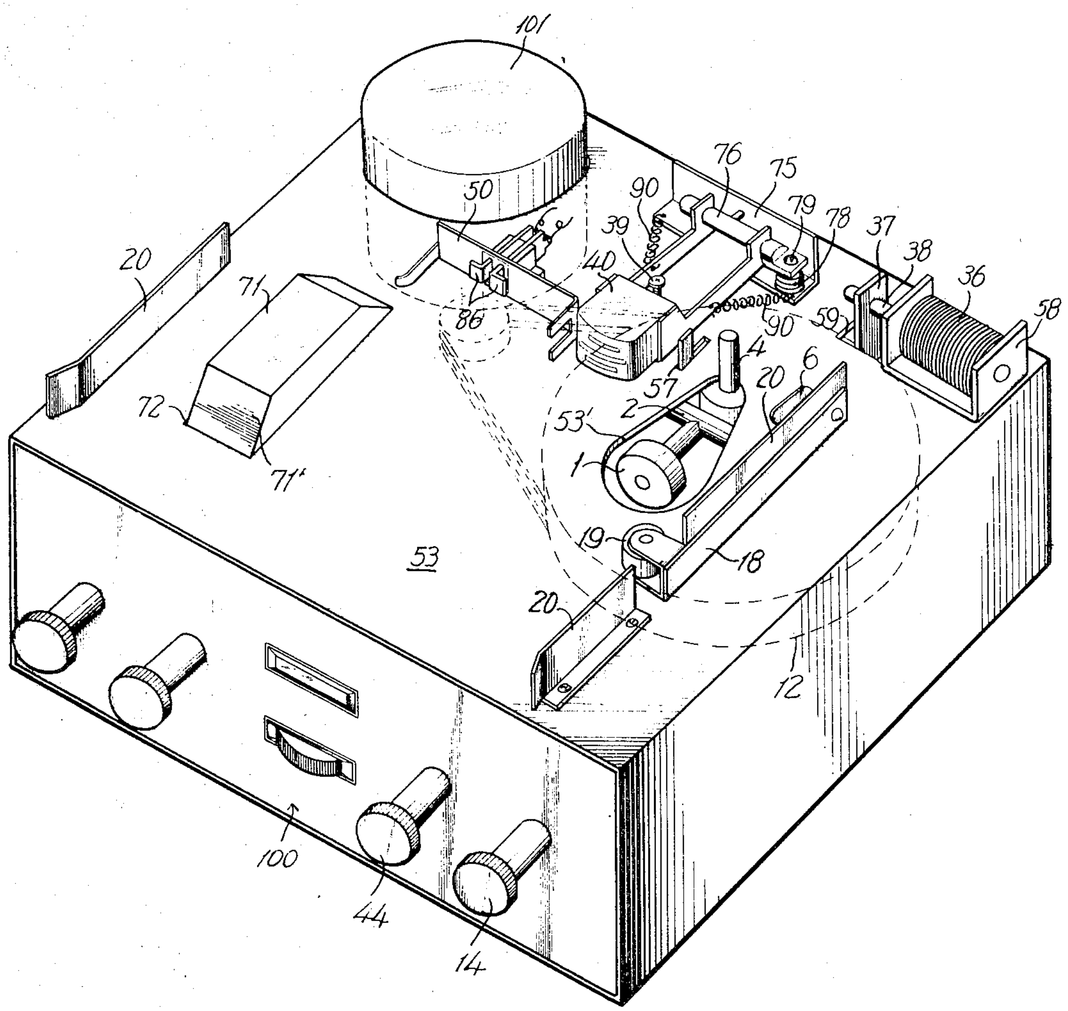
FIG. 1 is a perspective view of the assembled tape recorder according to this present invention.

Referring in detail to the attached drawings of an embodiment of the tape recorder according to this present invention, on the top plate 53 of the casing 100 of the tape recorder, as shown in FIG. 1, the cartridge guides 20,20, are mounted on both sides, between which the guide member 71 which freely rises and falls cooperates with the fitting hole 72 so that the respective cartridge 80 or 80′ or 80″ (FIGS. 5, 6, 7) containing the wound up tape as described in detail later, can be inserted between the cartridge guides 20,20, or between the cartridge guide 20 and the guide member 71. Cartridges 80 or 80′ or 80″ are different in width according to the length of the tape wound in them according to the length of time they play. The widest cartridge is 80″.

At the inner end of this cartridge inserting portion, the Capstan 4, the tape head 40 and the cartridge holding and tape guiding metal piece 50 are fitted, and near Capstan 4, the pinch roller rise-fall hole 53″ is located in the top plate 53, under which the pinch roller 1 is fitted at a right angle to the rotary shaft 2 that is rotatably mounted on the bearing metal piece 3 (FIG. 2) on the base plate 62 (FIG. 2) and the fitting base plate 15 (FIG. 2), the pinch roller 1 being able to be in pressing contact with the Capstan 4, between which the cartridge and the tape are inserted, and they are fed at a fixed speed by the working of the Capstan 4 which is rotated at the fixed speed by means of the flywheel 12 which is located as is known, below the base plate 62 (FIG. 2) and is driven by a motive mechanism such as a motor 10 so that the tape passes in the front of the recording head 40.

Figure 2:
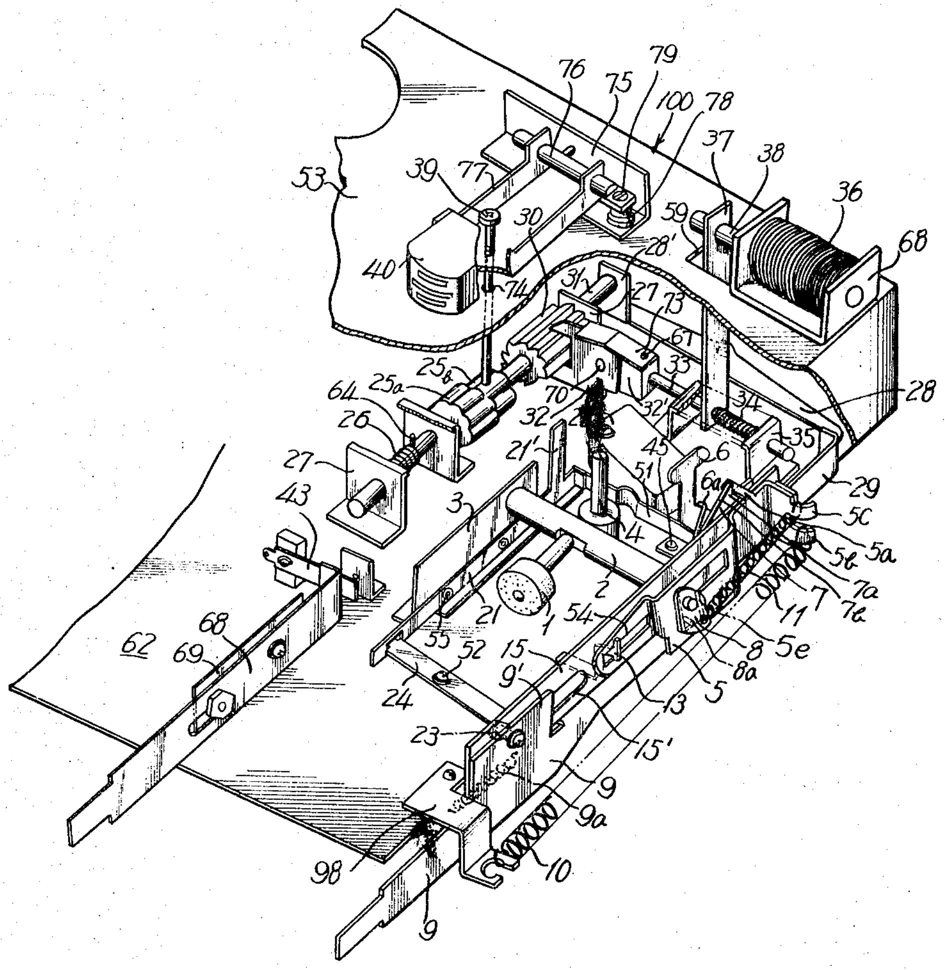
FIG. 2 is a perspective view thereof showing its inside mechanism with its top plate partially removed.

In the mechanism for rise-fall operation of the pinch roller 1, the rise-fall lever 6 is located close to the cartridge guide 20 which is on one side of the top plate 53 and projects above the top plate 53, the rise-fall lever 6 being supported rotatably by the washer 45 as shown in FIG. 2. At the shaft of the rise-fall lever 6, the spring 6*a* is fixed and the engaging stop plate 7 is also rotatably fitted to the same shaft in the inside of the fitting base plate 15 (FIG. 2) provided at one side of the base plate 62 in the casing 100, accordingly, in a normal condition, the rise-fall lever 6 and the engaging stop plate 7 (FIG. 2) are to be rotated as one body in this side by the resilient force of the spring 6*a*, being slidably adjusted to the fitting base plate 15 in this state.

Figure 5:
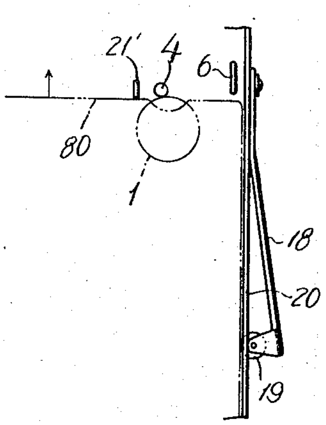
FIG. 5 is a detail of the means for inserting the cartridge for four tracks.
Figure 6:
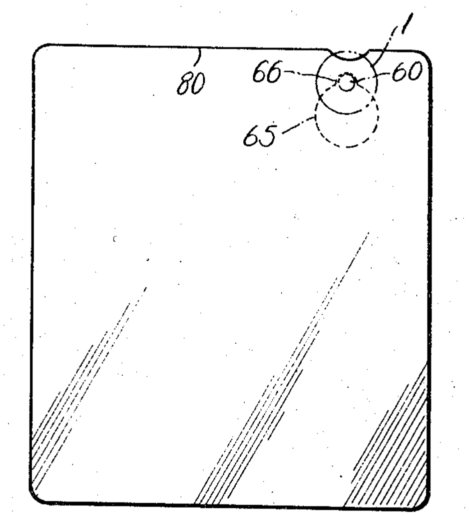
FIG. 6 is a top view of the cartridge.

When the slide plate 5 (FIG. 2) being guided by the guide metal piece 13 fixed on the base plate 62 and the guide hole 5*d* is pushed forward by the projection 9′ of the operating plate 9 (FIG. 2), which is pushed along the guide hole 15′ of the fitting base plate 15 by the operation of the pushbutton 14, it is stopped at its desired position by the engaging stop step 7*a* (FIG. 2) of the engaging stop plate 7 engaged with the engaging stop projection 5*a* of the slide plate. The rise-fall lever 6 in such a condition is pushed forward with the engaging stop plate 7 by the corner of the inserted cartridge 80 or 80″ which does not contain the pinch roller 1, such as the cartridge of the known four track tape as shown in FIGS. 5 and 6, and thereby the engaging projection 5*a* is disengaged from the engaging stop step 7*a*, and the slide plate 5 is pulled back along the fitting base plate 15 by the tension of the spring 10 located between the engaging stop 5*b* of the fitting base plate 15 and the fitting metal piece 98 at this side of the base plate 62.

The spring 11 (FIG. 2) operates to put down, as shown in FIG. 2, the pinch roller 1 of the rotary shaft 2 and extends between the rotary arm 8 fixed to one end of the rotary shaft 2 and the other engaging stop 5*c* of the slide plate 5, and at the same time, the pinch roller 1 rotates the rotary arm 8 and the rotary shaft 2 by sliding the pin 8*a* provided at the inside of the rotary arm 8 along the cam of the cam hole 5*e* of the slide plate 5 which is pulled in the direction of this side, thereby the pinch roller 1 is raised until its circumferential surface becomes parallel with the Capstan 4, as mentioned above, so that they are in pressing contact against each other.

To bring down the pinch roller 1 which is in such a raised position, by pushing the pushbutton 14 (FIG. 1) arranged at the projected portion, as shown in FIG. 1, outside of the casing 100 of the operating plate 9, the projection 9′ of the operating plate 9 being guided to slide forward by the projection piece 23 to the guide hole 15′ of the fitting base plate 15, contacts with and pushes forward the base end of the slide plate 5 which is moving back along the fitting base plate 15 in the same way.

Consequently, the engaging stop projection 5*a* of the slide plate 5 pushes down and forward the slant top edge 7*b* of the engaging stop plate 7, then by passing by the engaging stop step 7*a*, the engaging plate 7 is restored to the original state by the resilient force of the spring 6*a* to keep the advanced slide plate 5 at its fixed advanced position, and afterwards, by releasing the pushbutton 14, the resilience of the spring 9*a* extending between the fitting metal piece 98 and the operating plate 9.

Figure 3:
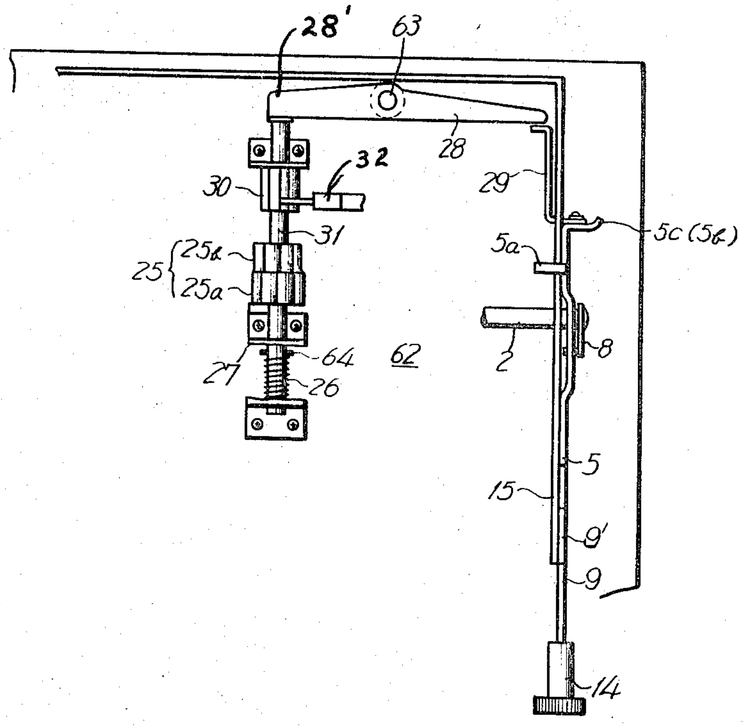
FIG. 3 is a top plan of the cam changeover operating mechanism by the operation board.

In the structure of this present invention, the operating projection 29 is provided at the front of the slide plate 5, and one end of the pivoted lever 28 pivotally mounted onto the base plate 62 by the pivot 63, as further shown in FIG. 3, faces the locus of movement of this operating piece 29, the other end of the rotary lever 28 being positioned facing the front of the cam shaft 31 which is slidably set by the bearing members 27, 27′ on the base plate 62.

To this cam shaft 31 are fixed the cam unit 25, comprising the cam 25*a* for use with; a four-track tape and the cam 25*b* for use with an eight track tape, between the bearing members 27 and 27′, and the comparatively long driving gear 30 with the shaft of the same length as the cam unit 25. One bearing member shoe 27 of these two cams is formed in a shape of an inverted-U, in which the spring 26 is fixed to the cam shaft 31 so that the axial force of this spring 26 is applied to the cam shaft 31 by the transverse set pin 64 provided on the cam shaft 31, (FIG. 3), which consequently operates to keep the cam shaft 31 sliding in the direction of the other end 28′ of the pivoted lever 28.

On the back of the top plate 53 is provided another support base 75, (FIG. 1) to which the lateral shaft 76 supported by the adjusted pin 79 through the medium of the resilient members 78 is fixed, while the base end of the fitting frame 77 is fixed to the lateral shaft 76. To the other end of the fitting frame 77 is fixed the recording head 40 for the tape. The other support pin 39 fitted to the front of the fitting frame 77 adjustably engages the fitting frame 77 and also vertically slides through the hole 74 of the top plate 53 freely, the bottom of which pin being engaged on the cam member 25 is to keep the height of the recording head 40 at its prescribed relative position against the resilience of the spring 90,90, (FIG. 1) stretched between the fitting frame 77 and the stop plate 53. By such a series of actions, the adjusting cam mechanism for either four track or that for eight track operation can be selected by suitable changeover by selecting either the cam 25*a* or the cam 25*b* in the cam unit 25.

For selecting the desired channel by changing over the track of each respective tape by rotating the cam unit 25, the solenoid 36 (FIG. 11) provided with the displaceable core piece 38 is provided on the supporting frame 58. To the displaceable core piece 38 is fixed the coupler bar 37 which extends downwards through the hole 59 of the top plate 53, and at one end of the coupler 37 is provided the changeover arm 32, and the sliding bar 33 slidably inserted in the supporting frame 35 is attached on its bottom end to the slide bar 35 to which is fixed the spring 34 (FIG. 11) which is stretched between one side of the supporting frame 35 and the fixed portion located at the bottom of the coupler bar 37, while the changeover arm or pawl 32 faces the ratchet feed gear 30 which is mounted on cam shaft 31.

The support base 69 is separately provided at the portion in the direction of the axis of the cam shaft 31 on the base plate 62, the sliding lever 68 (FIG. 12) arranged therefor is to close the switch base 43 by the front connecting portion of the sliding lever 68 (FIG. 12) and by closing of the switch base 43 the electric current passes through the winding of solenoid 36 to cause the sliding displacement of its sliding core 38. In other words, the electric current passes through the solenoid 36 by the pressure action of the sliding lever 68 with the pushbutton 44 applied against the switch base 43, (FIG. 2) attracting and displacing the sliding core 38 as shown by the arrow in FIG. 11, and retracting the pawl changeover arm 32, which engages with the feed gear 30 on cam shaft 31 as shown in the same FIG., thus this engaging relation is broken.

When the sliding lever 68 withdraws and the switch base 43 is turned off, the sliding bar 33, (FIG. 11) is restored to its original position again by the resilient power of the spring 34, thereby in this restoring operation, the upper projecting tooth **32*a* of the pawl changeover arm 32 acts on the ratchet feed gear 30 to rotate it through the prescribed angle, and at the rotated position the lower projecting tooth 32*b* is engagedly stopped to lock the prescribed rotated position, thus by the changeover operation of this pawl changeover arm 32 the cam unit 25 (FIG. 3) is rotated to adjust the head 40** position in accordance respectively with each track on the tape.

Figure 4:
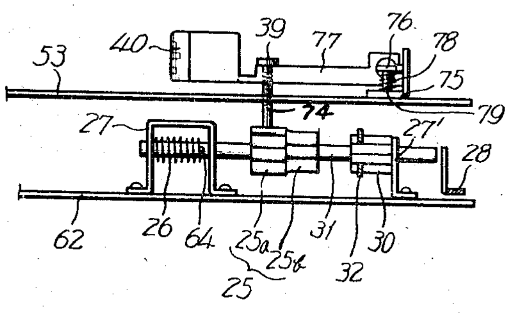
FIG. 4 is a detail elevation of the head and the cam section.

To make such feed tooth operation function smoothly, the pawl changeover arm 32 is mounted on the end of the sliding bar 33 so as to be rotated downward through a suitable angle around the pivot 70, (FIG. 11) further on the top thereof is provided the spring 73 acting on the portion of the upper projecting tooth **32*a* of arm 32 by its resilient force and is fixed to the base side from the pivot 70 with the stopper 67, thereby when withdrawn from the ratchet feed gear 30 by the resilient force of the spring 73 the changeover arm or pawl 32 is inclined downward suitably whereby at the time of the next forward advance of bar 33, it engages with the next tooth adjacent to the gear with which it has engaged, thus moving the tooth forward, and the downward inclined pawl changeover arm 32 is pushed up to its normal position as shown in FIG. 4 by the rotation of its feed gear 30**.

The operation of this solenoid core 36 is made not only by the manual switch operation as mentioned above, but also by an automatic circuit closing by the conducting element 82, such as foil at the channel end of the tape 81 in the respective cartridge 80 or 80′ or 80″ as illustrated in FIG. 13. The solenoid circuit 84 connected to the solenoid 36 is connected branching from the circuit 83 leading to the amplifier 85 connected with the starting switch 22 but connected at a part of the solenoid circuit 84, the tape contact circuit 87 through the medium of two terminal contactors 86 or 86 provided for cartridge holding and the tape guiding metal piece 50 as shown in FIG. 10, and the contact base circuit 88 (FIG. 13) provided with the switch 43 for changeover of the channel as mentioned above, are connected in parallel, accordingly by the manual operation of the pushbutton 44 (FIG. 1) the solenoid is energized with electricity to change the channel, besides, when it reaches the end of the appropriate channel, and the conducting element 82 energizes the terminals 86,86, (FIG. 13), current passes through and the changeover of this channel is made automatically.

Loud speaker 102 is connected to the output of amplifier 85. Another slide metal piece 21 (FIG. 1) is arranged for the bearing metal piece 3 (FIG. 2) which supports the rotary shaft 2, and the projection 21′ thereof projects above the top plate 53 as shown in FIG. 1, so that the driving power is obtained by its front end when the particular cartridge 80 or 80′ or 80″ is inserted. To the base end of this slide piece 21 (FIG. 2) is connected one end of the swinging arm 24 which swings on the pivot at its center, while at the other end of this swinging arm 24 the projecting piece 23 arranged for the operating plate as mentioned above is located so as to receive operating energy by its advance, further the end of the slide piece 21 faces the free moving end of the leaf spring 51 for operating the control arranged for the starting switch 22 (FIG. 9, 13) the projection 21′ thereof being arranged to close the starting switch 22 (FIGS. 9, 13) by being advanced as mentioned above for starting the motor 10 which is for rotating the Capstan 4, while the operation of such motor is to be stopped by the advancing operation of the operating plate 9 (FIG. 3) by actuation of the pushbutton 14 (FIG. 3).

Figure 14:
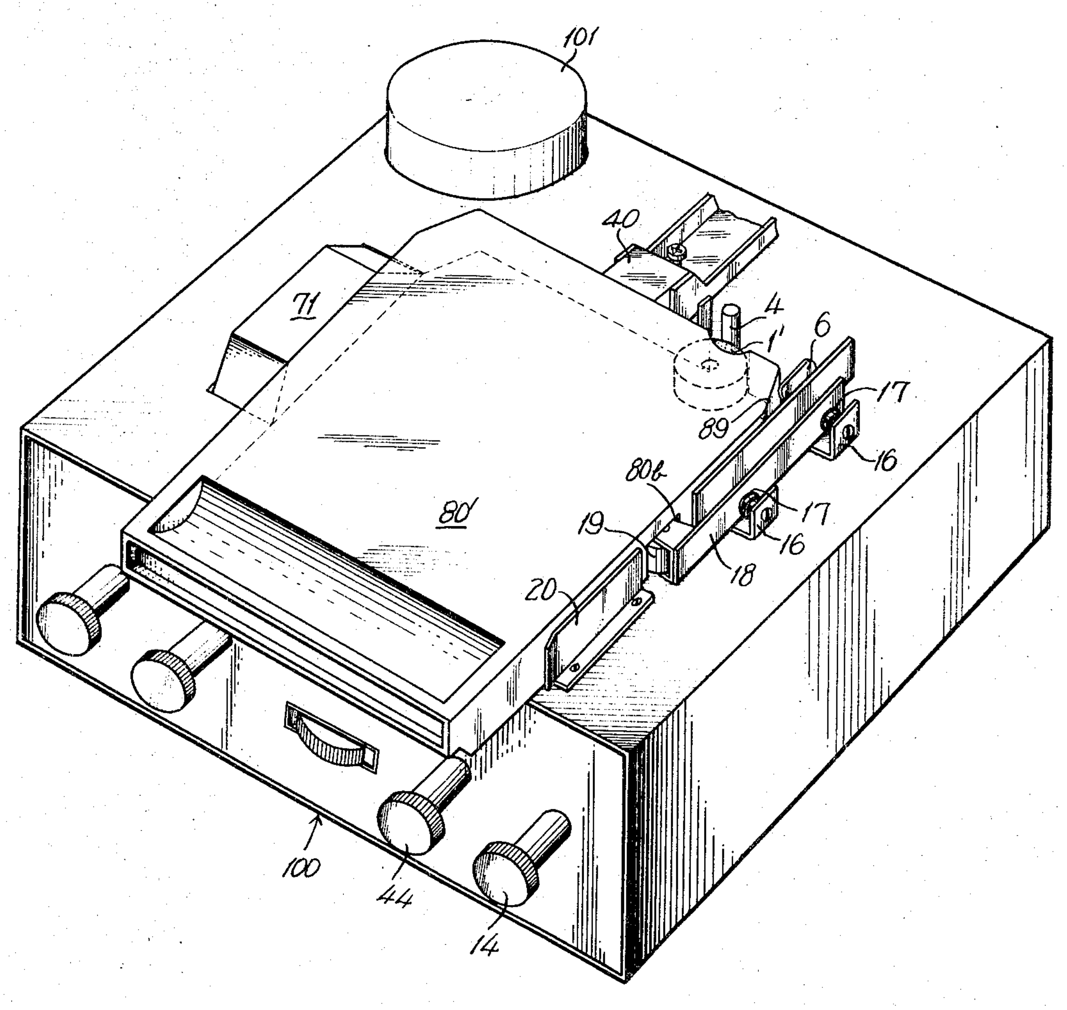
FIG. 14 is a perspective of the recorder with a tape cartridge with the pinch roller.
Figure 15:
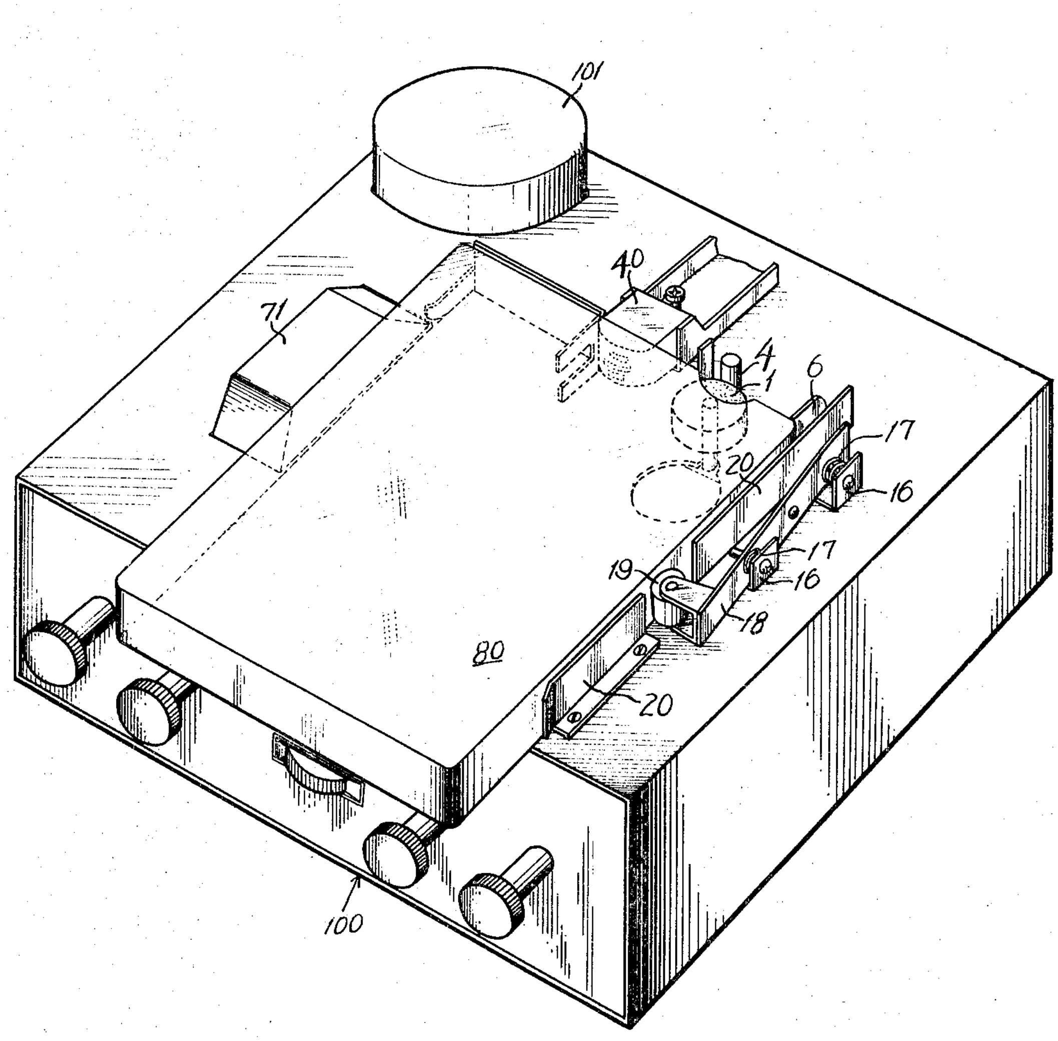
FIG. 15 is a perspective of the tape recorder with a narrow tape cartridge inserted thereon, raising the pinch roller in the recorder.

The respective cartridges 80, 80′ or 80″ are different in width according to the length of the tape wound in them (the length of the time in playing the channel). For such difference, in the embodiment shown of this present invention, the cartridge guides 20,20, (FIG. 1) which are the guiding members as shown in FIG. 1, are arranged on both sides of the top plate 53 at the proper distance in accordance with the widest cartridge 80″. Besides, the marginal guide member 71 is fitted to its fitting hole 72 (FIG. 1) at the distance in accordance with the width of the narrower particular cartridge 80 or 80′ which is narrower than the widest cartridge 80″, measuring from a one cartridge guide 20 at one side, and the marginal guide member 71 (FIG. 1) being fitted in its fitting hole 72 projects above the top plate 53 as shown in FIG. 14 to limit lateral movement of the cartridge, but for the widest cartridge 80″ the guide member 71 is depressed and sinks down in the fitting hole 72 as shown in FIG. 16.

Figure 17:
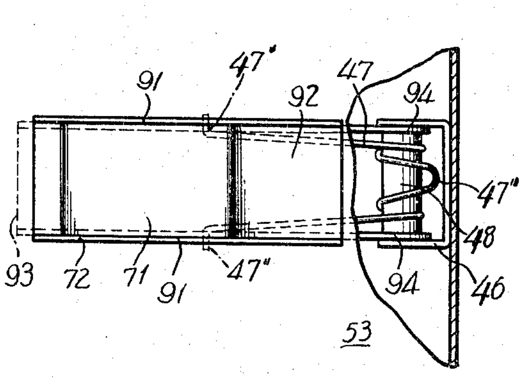
FIG. 17 is a sectional plan view of the guide means of the cartridge.
Figure 18:
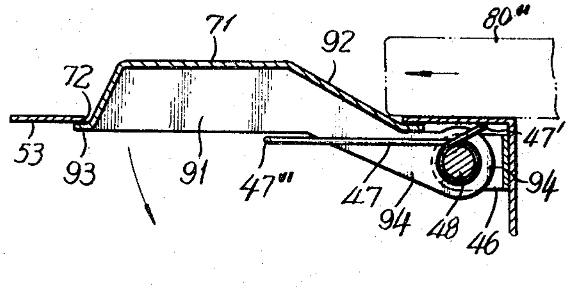
FIG. 18 is a sectional view of the guide means of the cartridge.

The arrangement for operating such guide member 71 is as shown in FIG. 17 and FIG. 18, in which the marginal guide member 71 forms the vertical walls 91,91, (FIG. 18) at both sides thereof, and on its one end surface the slanting wall 92 (FIG. 17) is formed, while the engaging stop 92 is provided at the other end, one end side of the vertical walls 91,91, suitably extending downward to form the bearings 94,94, and being rotatably supported by the rotary shaft 48 on the fitting metal piece 46, (FIG. 18) which is provided at the bottom of the top plate 53. Further around the rotary shaft 48 is mounted the spring 47 being in contact with the bottom surface of the top plate 53, and the pointed end 47″ thereof being engaged with the bottom edge of the vertical walls 91,91, (FIG. 18) so as to keep pushing up the other end of the marginal member 71 to make it project above the fitting hole 72.

Figure 16:
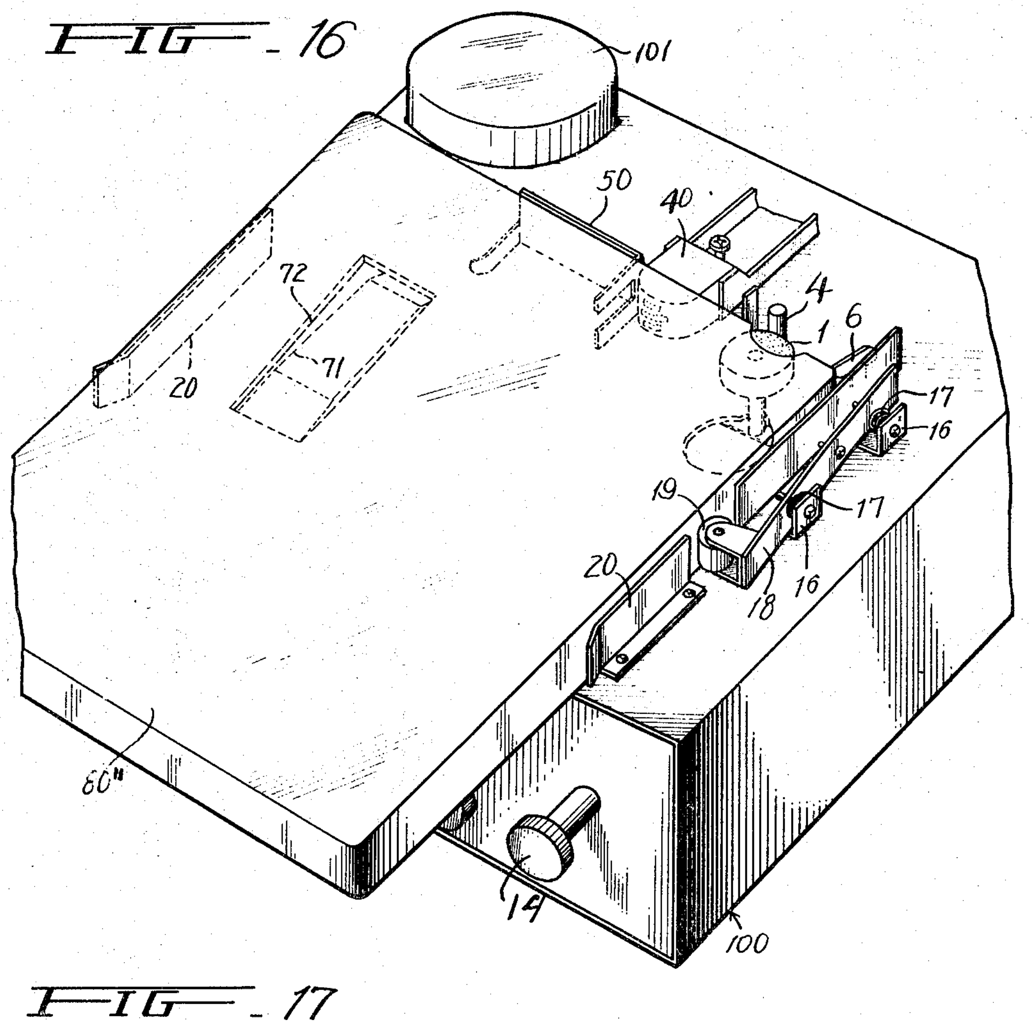
FIG. 16 is a perspective of the tape recorder with a wide cartridge inserted thereon.

By such arrangement the vertical wall 91 at one side operates as the guide for the cartridges 80 or 80′, but in case the wide cartridge 80″ is inserted in the cartridge guides 20,20, as shown in FIG. 18, the slanting wall 92 is pushed downward by the bottom edge of this wide inserted cartridge 80″ and the marginal guide member 71 is depressed and pushed down from the fitting hole 72 against the resilient force of the spring 47, thus the cartridge is applied as shown in FIG. 16.

As shown in the drawings, the cartridge guide 20 at one side of top plate 53 is divided at its center as shown in FIG. 1 or FIGS. 14—16, at this dividing position the pressing roller 19 is applied to the spring plate 18. The spring plate 18 may be one made of resilient material as shown in FIG. 1, or it may be also one supported by the brackets 16,16, through the medium of the spiral springs 17,17, so that the roller 19 gets the resilient pressing application.

To explain the operation of the pressure roller 19 performing such resilient pressing function, in the case of the particular cartridges 80 and 80″ in which the pinch roller 1 is not provided as mentioned above, as shown in FIG. 6, the pinch roller fitting hole 65 having a partially enlarged portion 66 as shown in FIG. 6, is formed at the position meeting with the rise-fall hole 53″ of the pinch roller 1 as shown in FIG. 1 at the bottom of the said cartridge, and as already described above, the pinch roller 1 to be raised engages with its enlarged portion 66 at its shaft 60 to push forward the respective cartridges 80, 80″ and keep this at the precise prescribed relation position, in this case, as shown in FIG. 16, the precise relative-position is kept on the basis of the cartridge guide 20 (FIG. 1)

or the guide member 71 at the other side by the pressure of the pressure roller 19 as shown in FIG. 16.

Figure 7:
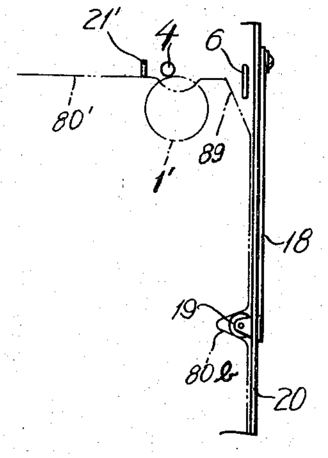
FIG. 7 is a detail showing the inserted cartridge for eight track tape and its adjacent members.
Figure 8:
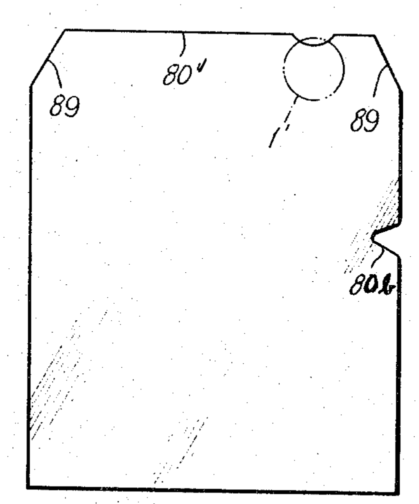
FIG. 8 is a detail view of the cartridge.

In case the wider cartridge 80'' in which the pinch roller 1' is mounted is used, the engaging recess **80*b* is provided as shown in FIG. 7 and 8 on the side of such cartridge 80' so that the pressure roller 19 is engaged into the recess 80*b* when the cartridge 80' has advanced and has reached its prescribed position as shown in FIG. 7 or FIG. 14, thereby the movement of the cartridge 80'** in the sliding direction is arrested.

Furthermore, in the case of such cartridge 80' in which the pinch roller 1' is mounted, the cutoff portion 89 (FIG. 14) is provided at both its fore sides so that the contact and pressing of the cartridge 80' against the rise-fall lever 6 is avoided by such cutoff portion 89, accordingly when the cartridge 80' is pushed in, the pinch roller 1 in the casing 100 is not raised.

The operation of the device of this present invention is as follows. When using the narrow cartridge 80 in which the pinch roller is not mounted as shown in FIG. 6 such as a four track type cartridge as 80, or in case of using the wide cartridge 80'' as shown in FIG. 16, the starting lever 6 is pushed by the front end corner of the cartridge 80 or 80''. Thereby the rotary shaft 2 (FIG. 1) having the pinch roller 1 as described above is rotated to feed the tape in the cartridge 80 as shown in FIG. 5, and in the other case of inserting the cartridge provided with the pinch roller 1' therein such as the cartridge 80' shown in FIG. 8, the shoulder of the cartridge 80' has the clipped corner portion 89, accordingly the starting lever 6 is not operated even when the cartridge 80' is inserted, but as mentioned above the pressing roller 19 (FIG. 16) of the spring plate 18 fitted to the fitting base plate 15 engages with the engaging recess **80*b* of the cartridge 80' to hold it, thereby the pinch roller 1' (FIG. 8) is pressedly contacted with the Capstan 4 as shown in FIG. 7** to feed the tape as in the abovementioned case.

In the case where the cartridge 80 having a four track tape, as shown in FIG. 5, where the starting lever is operated as described above, or the wide cartridge 80'' in FIG. 16 is inserted, the engaging stop step **7*a* (FIG. 2) is disengaged from the projection 5*a* by the operation of the starting lever 6 as shown in FIG. 2, while the slide plate 5 is pushed in this direction by the resilience of the spring 10, consequently the operating projection 29 fitted to the slide plate 5 is also actuated and the swinging lever 28 is disengaged from the operating projection 29, thus its stopping operation for the cam shaft 31 at the other end thereof is released and the cam shaft 31 is pushed forward by the resilient force of the spring 26, consequently the cam 25*a* gets into contact with the supporting pin 39 resulting in the pressed contact relation of the recording head 40 and the tape by the cam 25*a*** for a four track cartridge.

On the contrary, in case the cartridge 80' as shown in FIG. 8 is inserted, the relation as shown in FIG. 2 is attained, that is, the engaging relation between the engaging stop step **7*a* and the engaging projection 5*a* is kept as it is, the pinch roller 1 is left in its lowered position, thus the operating projection 29 is kept acting on one end of the rotary lever 28, and the cam shaft 31 is pushed forward against the resilient force of the spring 26, while the supporting pin 39 is in contact with the cam 25*a***, thus the relative position suited for eight track operation is set up.

When the cam has changed over in this way, the changeover or pawl arm 32 can be moved to act on the feed gear 30 for smooth and suitable changeover of the channel and for the desired playing of the recorded tape either by manual operation for closing the electric circuit for conducting the electric current by means of the pushbutton 44 (FIG. 1) to the solenoid 36, or by automatic closing operation for circuit turning on the electric current by means of the conductive area at the end of the tape 81. The parallel portion of the head 40 with the tape surface is suitably set by the adjustment of the supporting pin 39 and the adjustment of the relative supporting height of the adjuster 79, (FIG. 1).

I claim:

1. In a cartridge tape recorder having a head, a Capstan, a pinch roller and a plate on which are mounted cartridge guides, a head supporting pin, a cam shaft slideably positioned under said pin, a plurality of cams fixedly mounted on said cam shaft, a spring on said cam shaft tending to slide said cam shaft in one direction, a pivotally mounted lever engaging one end of said cam shaft and means operable by the insertion of the cartridge on said plate for pivoting said lever and sliding said cam shaft against said spring whereby one of said cams supports said pin and changes the position of said head relative to the tape.

2. In a cartridge tape recorder as claimed in claim 1 including means pivotally supporting the pinch roller for raising and lowering said pinch roller relative to the plate, a second lever extending through the plate in the path of the inserted cartridge for being moved thereby, a slideable plate operably connected to said second lever for movement therewith, said second means including a rotary shaft supporting said pinch roller and an arm fixed to said shaft and operatively connected to said plate for being pivoted thereby.

3. In a cartridge tape recorder as claimed in claim 2 including a projection on said slideable plate for engaging said first lever for pivoting the same against said spring.

4. In a cartridge tape recorder as claimed in claim 3 including a slideable metal piece having a projection extending above the plate in the path of the inserted cartridge for being moved thereby, a pivoted lever connecting said slideable metal piece and said slideable plate, a switch controlling the operation of the Capstan and a leaf spring for operating said switch and being in the path of said slideable metal piece for being moved to close said switch.

5. In a cartridge tape recorder as claimed in claim 4 including a feed gear on said cam shaft, a solenoid, means for supplying current to said solenoid, an arm moveable by said solenoid in one direction, a spring for moving said arm in an opposite direction, a slideable rod operatively connected to said arm and a pawl on said rod positioned for rotating said feed gear upon movement of said arm by said spring.

6. In a cartridge tape recorder as claimed in claim 5 wherein said pawl being pivotally attached to said rod and a spring tends to pivot said pawl inclined downwardly for engaging a lower portion of said feed gear.

7. In a cartridge tape recorder as claimed in claim 6 including a circuit operatively connected to said solenoid, a conductor attached to the tape for closing said circuit and a pushbutton operated means for manually closing said circuit.

8. In a cartridge tape recorder as claimed in claim 7 including a cartridge guide member pivotally connected to said plate and positioned between said cartridge guides and resilient means tending to pivot said cartridge guide member above said plate.

9. In a cartridge tape recorder as claimed in claim 8 wherein said cartridge guide member has a wall normal to the plate for contacting a side surface of the cartridge and a slanting end wall for being engaged and depressed by a cartridge.

10. In a cartridge tape recorder as claimed in claim 9 wherein one of said cartridge guides has an opening, and a roller is resiliently supported for being positioned in said opening for pressing against an inserted cartridge.

11. In a cartridge tape recorder as claimed in claim 10 wherein the cartridge is provided with a pinch roller receiving opening in its bottom, cut off portions at its front end arranged so as not to engage with said second lever and a side recess for receiving said roller.